US012014699B2

(12) United States Patent
He

(10) Patent No.: US 12,014,699 B2
(45) Date of Patent: Jun. 18, 2024

(54) DISPLAY PANEL, DISPLAY PANEL DRIVING METHOD, AND DISPLAY DEVICE

(71) Applicant: HKC CORPORATION LIMITED, Shenzhen (CN)

(72) Inventor: HuaiLiang He, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 16/461,366

(22) PCT Filed: Feb. 20, 2019

(86) PCT No.: PCT/CN2019/075514
§ 371 (c)(1),
(2) Date: Aug. 6, 2020

(87) PCT Pub. No.: WO2020/155216
PCT Pub. Date: Aug. 6, 2020

(65) Prior Publication Data

US 2021/0366428 A1 Nov. 25, 2021

(30) Foreign Application Priority Data

Jan. 30, 2019 (CN) ......................... 201910089138.6

(51) Int. Cl.
*G09G 3/36* (2006.01)

(52) U.S. Cl.
CPC ......... *G09G 3/3688* (2013.01); *G09G 3/3614* (2013.01); *G09G 3/3677* (2013.01);
(Continued)

(58) Field of Classification Search
CPC ...... G09G 3/36; G09G 3/3688; G09G 3/3614; G09G 3/3677; G09G 3/3696;
(Continued)

(56) References Cited

U.S. PATENT DOCUMENTS

2005/0184944 A1* 8/2005 Miyata ................. G09G 3/3611 345/89
2006/0284815 A1* 12/2006 Kwon .................. G09G 3/3614 345/98
2011/0242065 A1* 10/2011 Hsu ........................ G09G 3/006 345/204

FOREIGN PATENT DOCUMENTS

CN 1455363 A 11/2003
CN 101814278 A 8/2010
(Continued)

OTHER PUBLICATIONS

International Search Report issued in corresponding International application No. PCT/CN2019/075514, dated Oct. 30, 2019 (9 pages).
(Continued)

*Primary Examiner* — Amy Onyekaba
*Assistant Examiner* — Cory A Almeida

(57) ABSTRACT

The present application discloses a display panel, a display panel driving method, and a display device. Each row of pixels includes a plurality of pixel groups, and each pixel group includes a first column of pixels and a second column of pixels which are adjacent; the first column of pixels and the second column of pixels are connected to a same data line; the first column of pixels is connected with a 2n−1th row of scanning lines, and the second column of pixels is connected with a 2nth row of scanning lines; a source driver outputs a driving voltage to each column of pixels, where for a same gray scale value, a driving voltage corresponding to the first column of pixels of at least one column is smaller than a driving voltage corresponding to the second column of pixels.

12 Claims, 6 Drawing Sheets

(52) U.S. Cl.
CPC ..... *G09G 3/3696* (2013.01); *G09G 2310/027* (2013.01); *G09G 2310/0278* (2013.01); *G09G 2310/08* (2013.01); *G09G 2320/0233* (2013.01); *G09G 2320/0673* (2013.01)

(58) Field of Classification Search
CPC ..... G09G 2310/027; G09G 2310/0278; G09G 2310/08; G09G 2320/0233; G09G 2320/0673
See application file for complete search history.

(56) References Cited

FOREIGN PATENT DOCUMENTS

| | | | |
|---|---|---|---|
| CN | 102254522 | A | 11/2011 |
| CN | 103472642 | A | 12/2013 |
| CN | 104391411 | A | 3/2015 |
| CN | 104751767 | A | 7/2015 |
| CN | 105761690 | A | 7/2016 |
| CN | 106205538 | A | 12/2016 |
| CN | 107065354 | A | 8/2017 |
| CN | 107301852 | A | 10/2017 |
| CN | 108847194 | A | 11/2018 |

OTHER PUBLICATIONS

Written opinion of the International Search Authority in corresponding International application No. PCT/CN2019/075514.
First Office Action from China patent office in a counterpart Chinese patent Application 201910089138.6, dated Dec. 9, 2019 (11 pages).
Second Office Action from China patent office in a counterpart Chinese patent Application 201910089138.6, dated Jun. 30, 2020 (10 pages).

* cited by examiner

DISPLAY PANEL, DISPLAY PANEL DRIVING METHOD, AND DISPLAY DEVICE

The present application claims priority to Chinese Patent Application No. CN 201910089138.6, filed with the National Intellectual Property Administration, PRC on Jan. 30, 2019, and entitled "DISPLAY PANEL, DISPLAY PANEL DRIVING METHOD, AND DISPLAY DEVICE", which is incorporated herein by reference in its entirety.

TECHNICAL FIELD

The present application relates to the technical field of display, and in particular, to a display panel, a display panel driving method, and a display device.

BACKGROUND

The statements herein merely provide background information related to the present application and do not necessarily constitute the prior art.

With the development and advancement of technology, flat display panels have become mainstream products of display panels due to their thin bodies, power saving and low radiation, etc., and have been widely used. More and more LCD panels are designed using a half source driver (HSD) architecture, which is slowly being accepted by consumers, and because of the omitting of a source driver, the cost is lower.

However, the architecture design of the HSD will cause vertical bright and dark lines, which will affect a display effect of the display panel.

SUMMARY

To achieve the above objective, the present application provides a display panel that improves vertical bright and dark lines, a display panel driving method, and a display device.

The present application discloses a display panel, which includes: a substrate; a multiplicity of data lines disposed on the substrate; a multiplicity of scanning lines disposed on the substrate; a multiplicity of pixels connected with the corresponding data lines and the corresponding scanning lines respectively; a gate driver that outputs gate starting signals to the scanning lines to turn on the pixels; and a source driver that outputs data driving signals to the data lines to charge the pixels; each row of pixels includes a plurality of pixel groups, and each pixel group includes a first column of pixels and a second column of pixels which are adjacent; the first column of pixels and the second column of pixels are connected to a same data line; the first column of pixels is connected with a 2n−1th row of scanning lines, and the second column of pixels is connected with a 2nth row of scanning lines. When the gate driver drives the 2n−1th row of scanning lines, the source driver charges the first column of pixels connected to the 2n−1th row of scanning lines through the corresponding data line, and when the 2nth row of scanning lines is driven, the source driver charges the second column of pixels connected to the 2nth row of scanning lines through the corresponding data line. During a display period, the source driver outputs data driving signals of opposite polarities, respectively, to the first column of pixels and the second column of pixels in the same pixel group connected to the same data line. For the first column of pixels of the next pixel group connected to the same data line, the data driving signals output by the source driver have a polarity opposite to the polarity of the first column of pixels of the previous pixel group. The source driver outputs a driving voltage to each column of pixels, where for a same gray scale value, a driving voltage corresponding to the first column of pixels of at least one column is smaller than a driving voltage corresponding to the second column of pixels; and the n is a natural number that is at least 1, and the display period is a frame.

The present application also discloses a driving method for the aforementioned display panel, which includes steps of:

outputting, by a source driver, a driving voltage to charge a first column of pixels when a 2n−1th row of scanning lines receives a gate starting signal;

outputting, by the source driver, a driving voltage to charge a second column of pixels when a 2nth row of scanning lines receives a gate starting signal;

where for a same gray scale value, a driving voltage corresponding to the first column of pixels of at least one column is smaller than a driving voltage corresponding to the second column of pixels;

and the n is a natural number that is at least 1.

Optionally, the first column of pixels connected to a 2m−3th column of data lines is blue, and the second column of pixels connected to a 2m−3th column of data lines is green; the first column of pixels connected to an mth column of data lines is red, and the second column of pixels connected to an mth column of data lines is blue; the first column of pixels connected to a 2m−1th column of data lines is green, and the second column of pixels connected to a 2m−1th column of data lines is red; the driving method includes steps of:

detecting a picture displayed on the display panel before the 2n−1th row of scanning lines receives the gate starting signal;

when it is detected that the second column of pixels on the 2m−1th column of data lines and the first column of pixels on the mth column of data lines are turned off, outputting, by the source driver, a driving voltage to charge the first column of pixels corresponding to the 2m−1th column of data lines and the second column of pixels corresponding to the 2m−3th column of data lines;

where a driving voltage output to the first column of pixels corresponding to the 2m−1th column of data lines is smaller than a driving voltage output to the second column of pixels corresponding to the 2m−3th column of data lines; and the m is an even number that is at least 2.

Optionally, the first column of pixels connected to a 2m−3th column of data lines is blue, and the second column of pixels connected to a 2m−3th column of data lines is green; the first column of pixels connected to an mth column of data lines is red, and the second column of pixels connected to an mth column of data lines is blue; the first column of pixels connected to a 2m−1th column of data lines is green, and the second column of pixels connected to a 2m−1th column of data lines is red; the driving method includes steps of:

detecting a picture displayed on the display panel before the 2n−1th row of scanning lines receives the gate starting signal;

when it is detected that the second column of pixels on the 2m−1th column of data lines and the first column of pixels on the mth column of data lines are turned off, during a time period of driving the scanning lines, outputting, by the source driver, a driving voltage to charge the first column of pixels corresponding to the 2m−1th column of data lines;

where during the time for charging the first column of pixels corresponding to the 2m−1th column of data lines, in a first time period, a driving voltage output to the first column of pixels corresponding to the 2m−1th column of data lines is equal to a driving voltage output to the second column of pixels corresponding to the 2m−3th column of data lines; in a second time period, a driving voltage output to the first column of pixels corresponding to the 2m−1th column of data lines is smaller than a driving voltage output to the second column of pixels corresponding to the 2m−3th column of data lines;

and the m is an even number that is at least 2.

Optionally, the step of outputting, by the source driver, a driving voltage to charge a first column of pixels when a 2n−1th row of scanning lines receives a gate starting signal also includes:

outputting, by the source driver, a driving voltage to charge the first column of pixels corresponding to a 2m−3th column of data lines, where a driving voltage output to the first column of pixels corresponding to the 2m−3th column of data lines is smaller than a driving voltage output to the second column of pixels corresponding to the 2m−3th column of data lines.

The step of outputting, by the source driver, a driving voltage to charge a second column of pixels when a 2nth row of scanning lines receives a gate starting signal also includes:

outputting, by the source driver, a driving voltage to charge the second column of pixels corresponding to an mth column of data lines, where a driving voltage output to the second column of pixels corresponding to the mth column of data lines is smaller than a driving voltage output to the second column of pixels corresponding to the 2m−3th column of data lines.

Optionally, the source driver outputs a driving voltage to each column of pixels, where for a same gray scale value, a driving voltage corresponding to all the first columns of pixels is smaller than a driving voltage corresponding to the second column of pixels.

Optionally, the source driver outputs a positive 7 volt driving voltage to the first column of pixels in the 2n−1th pixel group connected to the 2m−3th column of data lines, and a negative 7 volt driving voltage to the second column of pixels.

A driving voltage output to the first column of pixels in the 2nth pixel group connected to the 2m−3th column of data lines is positive 7 volts, and a driving voltage output to the second column of pixels is negative 7 volts.

Optionally, the source driver outputs a 0 volt driving voltage to the first column of pixels in the 2n−1th pixel group connected to the mth column of data lines, and a positive 7 volt driving voltage to the second column of pixels.

A driving voltage output to the first column of pixels in the 2nth pixel group connected to the mth column of data lines is 0 volt, and a driving voltage output to the second column of pixels is negative 7 volts.

Optionally, the source driver outputs a positive 7 volt driving voltage to the first column of pixels in the 2n−1th pixel group connected to the 2m−1th column of data lines, and a 0 volt driving voltage to the second column of pixels.

A driving voltage output to the first column of pixels in the 2nth pixel group connected to the mth column of data lines is negative 7 volts, and a driving voltage output to the second column of pixels is 0 volts.

The present application also discloses a display device including the display panel as described above, and the display device also includes: a gamma circuit that outputs a gamma voltage; a control chip that outputs a data signal to a source driver, and outputs a control signal to a gate driver, and a voltage conversion circuit that outputs a conversion voltage to the gamma circuit and the control chip.

Optionally, the control chip includes a first lookup table and a second lookup table, and voltages and time corresponding to gray scales are preset in the first lookup table and the second lookup table; when it is detected on a picture that the second column of pixels on the 2m−1th column of data lines and the first column of pixels on the mth column of data lines are turned off, voltages and time required for the source driver and the gate driver are searched for from the second lookup table; and when it is detected on the picture that the second column of pixels on the 2m−1th column of data lines and the first column of pixels on the mth column of data lines are not turned off, voltages and time required for the source driver and the gate driver are searched for from the second lookup table.

In a display panel designed using a half source driver (HSD) architecture, the first column of pixels and the second column of pixels are connected to the same data line, and data driving signals of the first column of pixels and the second column of pixels in the same pixel group connected to the same data line are opposite in polarity, and the polarity of the data driving signals of the first column of pixels in the next pixel group is opposite to the polarity of the data driving signals of the first column of pixels in the previous pixel group. In the same pixel group, when an object charged through the data line is switched from the first column of pixels to the second column of pixels, polarity reversal needs to be performed; due to the resistance-capacitance (RC) delay, in a time period of driving the scanning lines, a voltage of the actual pixel after the second column of pixels is charged cannot reach the driving voltage, so that the display is dark, and the second column of pixels presents a bright line as a whole; and when the object charged through the data line is switched from the second column of pixels to the first column of pixels in the next pixel group, the polarity is the same, so that the polarity reversal is not required, and an RC delay phenomenon is not obvious. During a scanning line driving time period, the voltage of the actual pixel after the first column of pixels is charged may be relatively close to or reach the driving voltage, and the display is brighter; the first column of pixels presents a bright line as a whole, and vertical bright and dark lines are presented in the whole display panel, which affects the display effect of the display panel.

In this solution, the source driver outputs a driving voltage to each column of pixels, where for the same gray scale value, the driving voltage corresponding to the first column of pixels of at least one column is smaller than the driving voltage corresponding to the second column of pixels; after charging, the voltage of the actual pixel of the first column of pixels is close to the voltage of the actual pixel of the second column of pixels, and the display brightness of the first column of pixels is darkened, so that the difference from the display brightness of the second column of pixels is reduced; therefore, the vertical bright and dark lines are not so obvious, and the influence of the vertical bright and dark lines is reduced, thereby improving a display effect of the display panel.

DESCRIPTION OF DRAWINGS

The accompanying drawings included are used to provide an understanding of the embodiments of the present application. The accompanying drawings form part of the specification, are used to illustrate the embodiments of the present application, and explain the principle of the present application together with the text description. Apparently, the accompanying drawings in the following description show merely some embodiments of the present application, and a person of ordinary skill in the art may still derive other accompanying drawings from these accompanying drawings without creative efforts. In the accompanying drawings.

DETAILED DESCRIPTION

Figure 1:
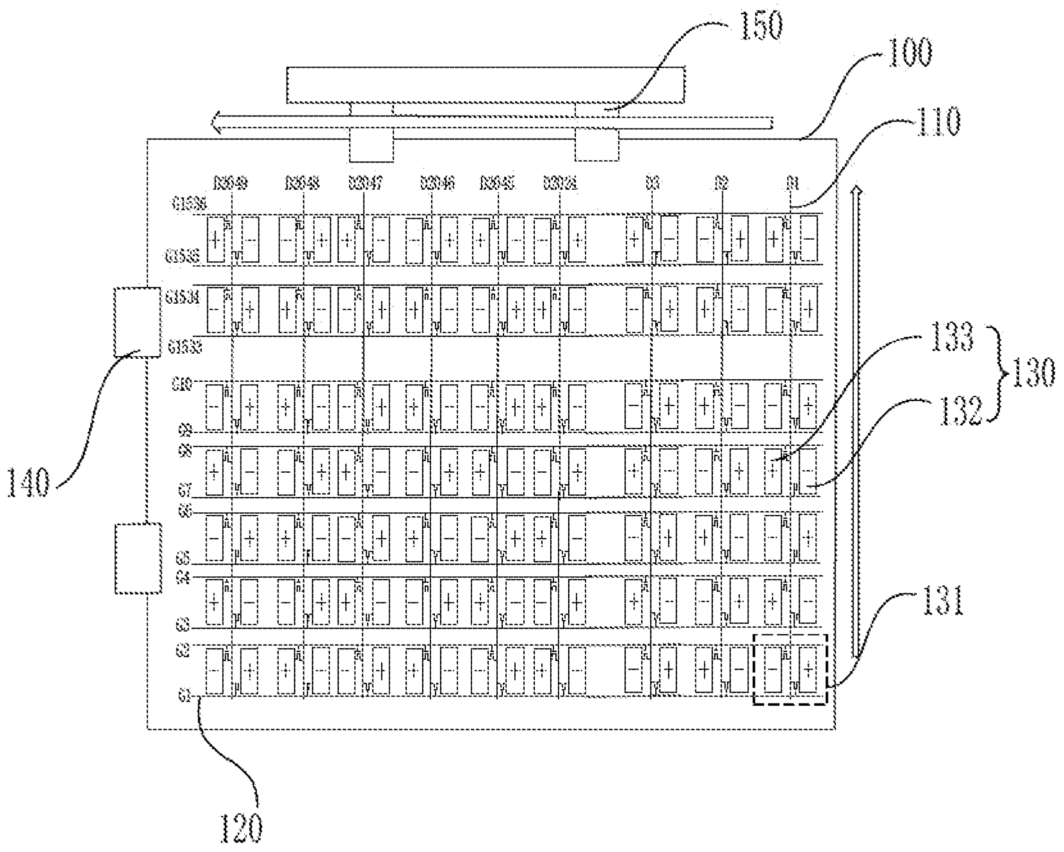
FIG. 1 is a schematic view of a display panel according to an embodiment of the present application.
Figure 2:
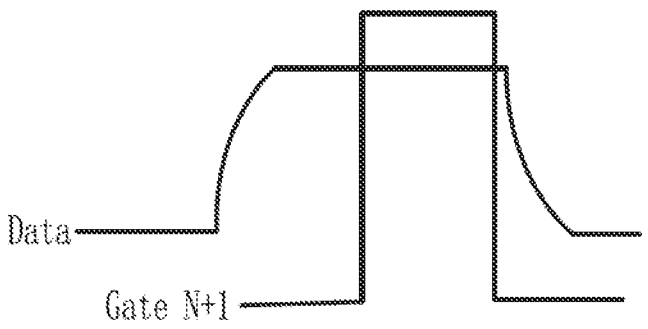
FIG. 2 is a schematic view of charging a first column of pixels according to an embodiment of the present application.
Figure 3:
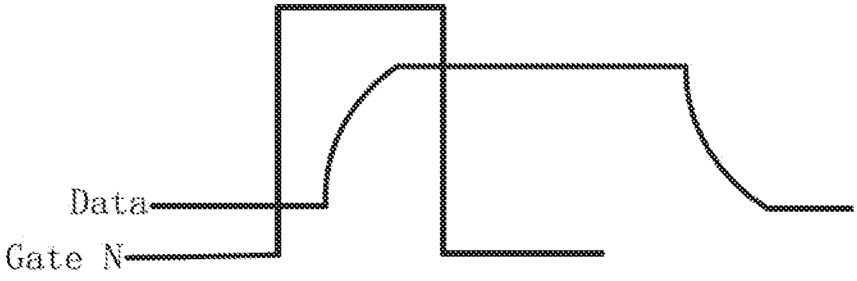
FIG. 3 is a schematic view of charging a second column of pixels according to an embodiment of the present application.

It needs be understood that the terms used herein, and specific structures and functional details disclosed are merely for the purpose of describing specific embodiments and are representative. However, the present application can be specifically embodied in many alternative forms, and should not be interpreted to be limited to the embodiments described herein.

In the description of the present application, the terms such as "first" and "second" are merely for a descriptive purpose, and cannot to be understood to indicate relative importance, or implicitly indicate the number of the indicated technical features. Hence, unless otherwise noted, the features defined by "first" and "second" can explicitly or implicitly include one or more features; and "a plurality of" means two or more. The term "include" and any variations thereof are intended to cover a non-exclusive inclusion, and may cover the presence or addition of one or more other features, integers, steps, operations, components and/or combinations thereof.

In addition, the terms "center", "transversal", "upper", "lower", "left", "right", "vertical", "horizontal", "top", "bottom", "inner", "outer", etc. which indicate orientation or position relationships are described based on the orientation or relative position relationships as shown in the drawings, only for the simplified description that facilitates the description of the present application, rather than indicating that the indicated device or element must have a particular orientation or be constructed and operated in a particular orientation. Therefore, these terms should not be understood as a limitation to the present application.

In addition, unless otherwise specified and defined, the terms "install", "connected with", "connected to" should be comprehended in a broad sense. For example, these terms may be comprehended as being fixedly connected, detachably connected or integrally connected; mechanically connected or electrically connected; or directly connected or indirectly connected through an intermediate medium, or in an internal communication between two elements. The specific meanings about the foregoing terms in the present application may be understood by those skilled in the art according to specific circumstances.

In the architectural design of the HSD, a display panel 10 has a problem of vertical bright and dark lines. The vertical bright and dark lines occur due to the conversion of data lines 110 from positive polarity to negative polarity. Because of the RC delay, the potential is not yet reached during the conversion process, which causes pixels 130 to be dark, and in structure design of the pixels 130, the positive and negative polarity conversion is performed in odd columns, thereby causing the vertical bright and dark lines.

The present application will be described below with reference to the accompanying drawings and optional embodiments.

As shown in FIG. 1, In one or more embodiments, a display panel 10 is disclosed. The display panel 10 includes a substrate 100, a multiplicity of data lines 110 disposed on the substrate 100, a multiplicity of scanning lines 120 disposed on the substrate 100, a multiplicity of pixels 130 connected with the corresponding data lines 110 and the corresponding scanning lines 120 respectively, a gate driver 140 that outputs gate starting signals to the scanning lines 120 to turn on the pixels 130, and a source driver 150 that outputs data driving signals to the data lines 110 to charge the pixels 130; each row of pixels 130 includes a plurality of pixel groups 131, and each pixel group 131 includes a first column of pixels 132 and a second column of pixels 133 which are adjacent; the first column of pixels 132 and the second column of pixels 133 are connected to a same data line 110; the first column of pixels 132 is connected with a 2n−1th row of scanning lines 120, and the second column of pixels 133 is connected with a 2nth row of scanning lines 120; when the gate driver 140 drives the 2n−1th row of scanning lines 120, the source driver 150 charges the first column of pixels 132 connected to the 2n−1th row of scanning lines 120 through the corresponding data line 110, and when the 2nth row of scanning lines 120 is driven, the source driver 150 charges the second column of pixels 133 connected to the 2nth row of scanning lines 120 through the corresponding data line 110; during a display period, the source driver 150 outputs data driving signals of opposite polarities, respectively, to the first column of pixels 132 and the second column of pixels 133 that are in the same pixel group 131 and are connected to the same data line 110; for the first column of pixels 132 of the next pixel group 131 connected to the same data line 110, the data driving signals output by the source driver 150 have a polarity opposite to the polarity of the first column of pixels 132 of the previous pixel group 131; the source driver 150 outputs a driving voltage to each column of pixels 130, where for a same gray scale value, a driving voltage corresponding to the first column of pixels 132 of at least one column is smaller than a driving voltage corresponding to the second column of pixels 133; the n is a natural number that is at least 1, and the display period is a frame.

In a display panel 10 designed using an architecture of a half source driver (HSD) 150, the first column of pixels 132 and the second column of pixels 133 are connected to the same data line 110, and data driving signals of the first column of pixels 132 and the second column of pixels 133 in the same pixel group 131 connected to the same data line 110 are opposite in polarity, and the polarity of the data driving signals of the first column of pixels 132 in the next pixel group 131 is opposite to the polarity of the data driving signals of the first column of pixels 132 in the previous pixel group 131. In the same pixel group 131, when an object charged through the data line 110 is switched from the first column of pixels 132 to the second column of pixels 133, polarity reversal needs to be performed; due to the resistance-capacitance (RC) delay, in a time period of driving the scanning lines 120, a voltage of the actual pixel 130 after the second column of pixels 133 is charged cannot reach the driving voltage, so that the display is dark, and the second column of pixels 133 presents a bright line as a whole; and when the object charged through the data line 110 is switched from the second column of pixels 131 to the first column of pixels 132 in the next pixel group 131, the polarity is the same, so that the polarity reversal is not required, and an RC delay phenomenon is not obvious. During a time period of driving the scanning lines 120, the voltage of the actual pixel 130 after the first column of pixels 132 is charged may be relatively close to or reach the driving voltage, and the display is brighter; the first column of pixels 132 presents a bright line as a whole, and vertical bright and dark lines are presented in the whole display panel 10, which affects the display effect of the display panel 10.

In this solution, the source driver 150 outputs a driving voltage to each column of pixels 130, where for the same gray scale value, the driving voltage corresponding to the first column of pixels 132 of at least one column is smaller than the driving voltage corresponding to second column of pixels 133; after charging, the voltage of the actual pixel 130 of the first column of pixels 132 is close to the voltage of the actual pixel 130 of the second column of pixels 133, and the display brightness of the first column of pixels 132 is darkened, so that the difference from the display brightness of the second column of pixels 133 is reduced; therefore, the vertical bright and dark lines are not so obvious, and the influence of the vertical bright and dark lines is reduced, thereby improving a display effect of the display panel 10.

As shown in FIG. 1 to FIG. 11, an embodiment discloses a driving method for the aforementioned display panel 10, including the following steps:

S11: outputting, by a source driver 150, a driving voltage to charge a first column of pixels 132 when a 2n−1th row of scanning lines 120 receives a gate starting signal;

S12: outputting, by the source driver 150, a driving voltage to charge a second column of pixels 133 when a 2nth row of scanning lines 120 receives a gate starting signal;

where for a same gray scale value, a driving voltage corresponding to the first column of pixels 132 of at least one column is smaller than a driving voltage corresponding to the second column of pixels 133; and the n is a natural number that is at least 1.

In this solution, the driving voltage corresponding to the first column of pixels 132 of at least one column is smaller than the driving voltage corresponding to the second column of pixels 133, so that the display brightness of the first column of pixels 132 of at least one column is darkened, and the difference from the display brightness of the second column of pixels 133 is reduced; the brightness of bright lines is darkened, so that the vertical bright and dark lines are not so obvious, and the influence of the vertical bright and dark lines is reduced, thereby improving a display effect of the display panel 10.

Figure 4:
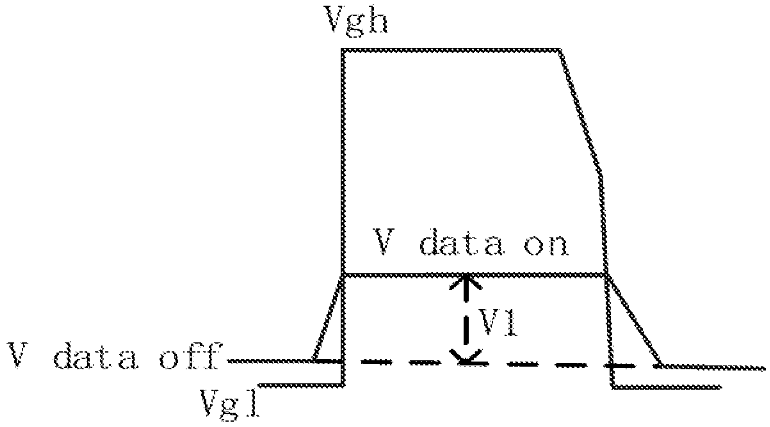
FIG. 4 is a schematic view of presetting a voltage of a first column of pixels according to an embodiment of the present application.
Figure 5:
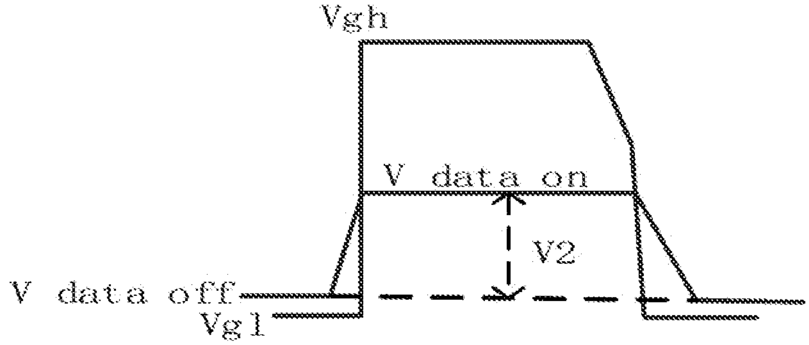
FIG. 5 is a schematic view of presetting a voltage of a second column of pixels according to an embodiment of the present application.
Figure 9:
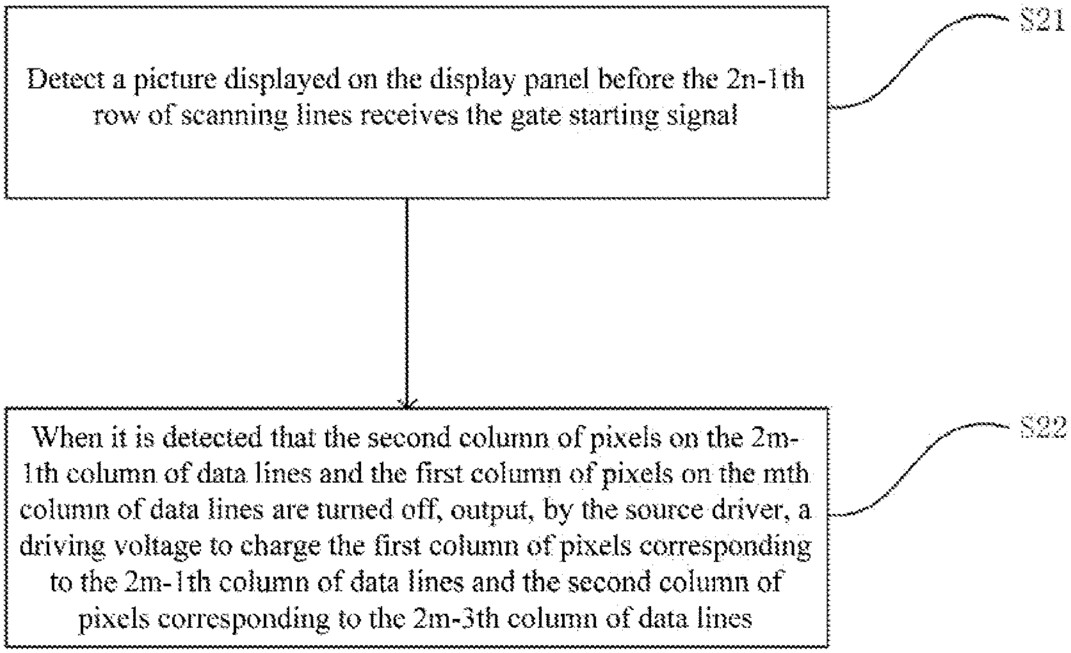
FIG. 9 is a schematic flow chart of a driving method for a display panel according to an embodiment of the present application.

In one or more embodiments, as shown in FIG. 4, FIG. 5, and FIG. 9, the first column of pixels 132 connected to a 2m−3th column of data lines 110 is blue, and the second column of pixels 133 connected thereto is green; the first column of pixels 132 connected to an mth column of data lines 110 is red, and the second column of pixels 133 connected thereto is blue; the first column of pixels 132 connected to a 2m−1th column of data lines 110 is green, and the second column of pixels 133 connected thereto is red; the driving method includes the following steps:

S21: detecting a picture displayed on the display panel 10 before the 2n−1th row of scanning lines 120 receives the gate starting signal;

S22: when it is detected that the second column of pixels 133 on the 2m−1th column of data lines 110 and the first column of pixels 132 on the mth column of data lines 110 are turned off, outputting, by the source driver 150, a driving voltage to charge the first column of pixels 132 corresponding to the 2m−1th column of data lines 110 and the second column of pixels 133 corresponding to the 2m−3th column of data lines 110;

where a driving voltage V1 output to the first column of pixels 132 corresponding to the 2m−1th column of data lines 110 is smaller than a driving voltage V2 output to the second column of pixels 133 corresponding to the 2m−3th column of data lines 110; and the m is an even number that is at least 2.

When the second column of pixels 133 on the 2m−1th column of data lines 110 and the first column of pixels 132 on the mth column of data lines 110 are turned off, the picture is in a kill pattern in which the picture does not display red and only displays blue and green. The first column of pixels 132 connected to the 2m−1th column of data line 110 is green, and is shown as a bright line. The second column of pixels 133 connected to the 2m−3th column of data lines 110 is green and is displayed as a dark line. Since the human eye is most sensitive to green, in the picture in the kill pattern, the vertical bright and dark lines are more obvious, which has a greater influence on the display effect. In this solution, a driving voltage output to the first column of pixels 132 corresponding to the 2m−1th column of data lines 110 is smaller than a driving voltage output to the second column of pixels 133 corresponding to the 2m−3th column of data lines 110; the charging efficiency of the first column of pixels 132 is lower than that of the second column of pixels 133, so that the display brightness of the first column of pixels 132 is darkened, and the difference from the display brightness of the second column of pixels 133 connected to the 2m−3th column of data lines 110 is reduced; as a result, green vertical bright and dark lines are not so obvious, and the influence of the vertical bright and dark lines can be reduced to a large extent, so that the display effect of the display panel 10 is improved more obviously; at the same time, the original architectural design of the display panel 10 does not need to be changed, and it is convenient to adjust the charging voltage; the implementation is easy, and the cost is reduced.

Figure 6:
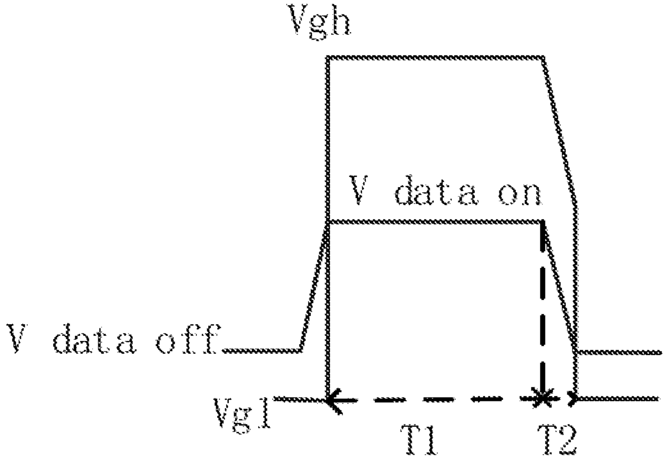
FIG. 6 is a schematic view of presetting a voltage of a first column of pixels according to an embodiment of the present application.
Figure 7:
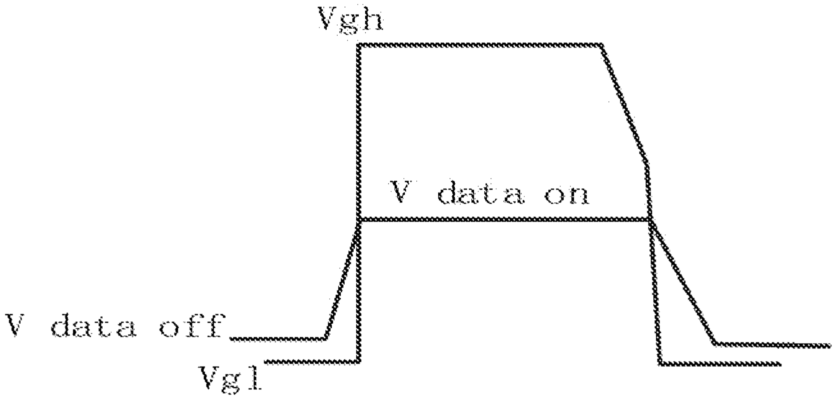
FIG. 7 is a schematic view of presetting a voltage of a second column of pixels according to an embodiment of the present application.
Figure 8:
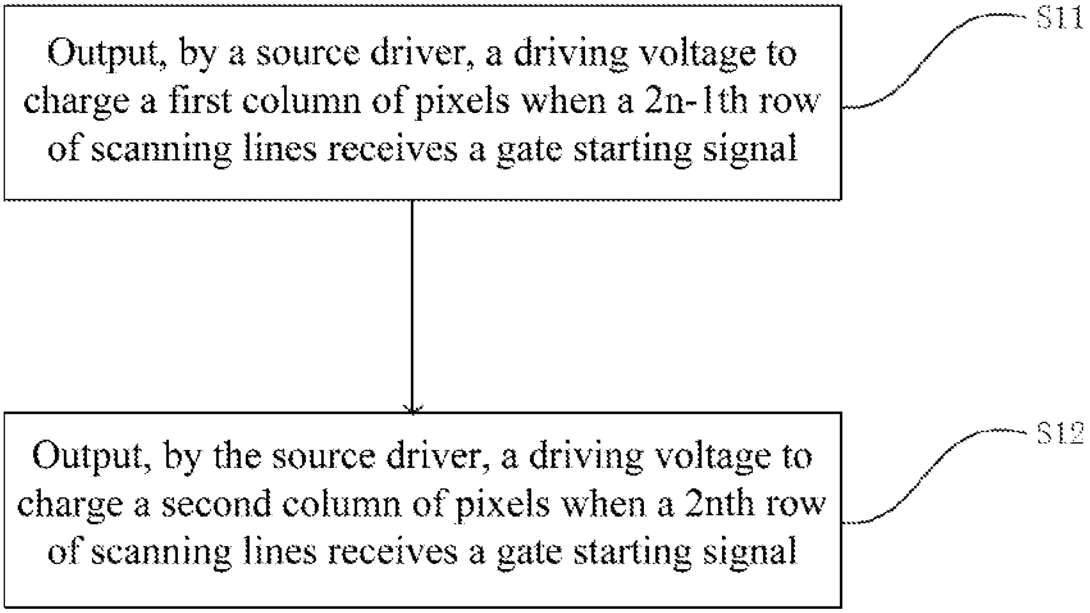
FIG. 8 is a schematic flow chart of a driving method for a display panel according to an embodiment of the present application.
Figure 10:
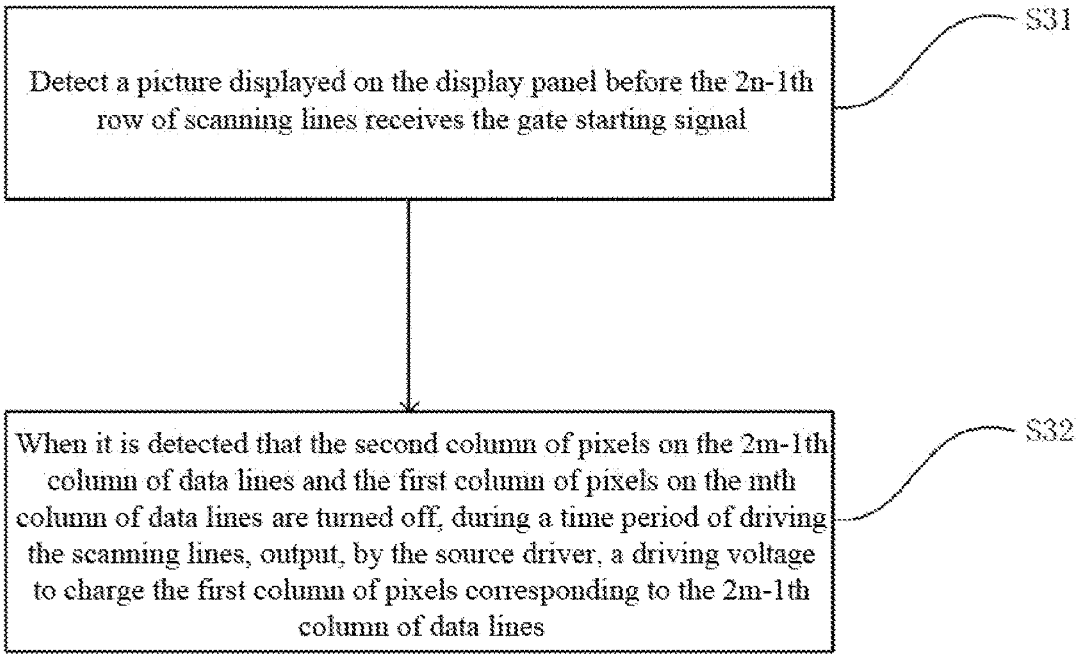
FIG. 10 is a schematic flow chart of a driving method for a display panel according to an embodiment of the present application.

In one or more embodiments, as shown in FIG. 6, FIG. 7, and FIG. 10, the first column of pixels 132 connected to a 2m−3th column of data lines 110 is blue, and the second column of pixels 133 connected thereto is green; the first column of pixels 132 connected to an mth column of data lines 110 is red, and the second column of pixels 133 connected thereto is blue; the first column of pixels 132 connected to a 2m−1th column of data lines 110 is green, and the second column of pixels 133 connected thereto is red; the driving method includes the following steps:

S31: detecting a picture displayed on the display panel 10 before the 2n−1th row of scanning lines 120 receives the gate starting signal;

S32: when it is detected that the second column of pixels 133 on the 2m−1th column of data lines 110 and the first column of pixels 132 on the mth column of data lines 110 are turned off, during a time period of driving the scanning lines 120, outputting, by the source driver 150, a driving voltage to charge the first column of pixels 132 corresponding to the 2m−1th column of data lines 110;

where during the time for charging the first column of pixels 132 corresponding to the 2m−1th column of data lines 110, in a first time period T1, the driving voltage output to the first column of pixels 132 corresponding to the 2m−1th column of data lines 110 is equal to the driving voltage output to the second column of pixels 133 corresponding to the 2m−3th column of data lines 110; in a second time period T2, a driving voltage output to the first column of pixels 132 corresponding to the 2m−1th column of data lines 110 is smaller than a driving voltage output to the second column of pixels 133 corresponding to the 2m−3th column of data lines 110; and the m is an even number that is at least 2.

In this solution, during the time period of driving the scanning lines 120, a driving voltage for charging the first column of pixels 132 is equal to a driving voltage for charging the second pixels 130 only in a first time period, and is smaller than a driving voltage for charging the second pixels 130 in a second time period; that is, the time for charging the first column of pixels 132 with a higher driving voltage is shortened, so that the voltage of the actual pixels 130 after the charging of one column of pixels 130 is set to be smaller than the driving voltage, and the display brightness of the first column of pixels 132 is darkened; and the difference from the display brightness of the second column of pixels 133 connected to the 2m−3th column of data lines 110 is reduced, thereby reducing the influence of the vertical bright and dark lines, and improving the display effect of the display panel 10. In this solution, by shortening the time for charging the first column of pixels 132 with a higher driving voltage, the display brightness of the first column of pixels 132 is darkened, and the influence of the vertical bright and dark lines can be greatly reduced, and the display effect of the display panel 10 is improved more obviously; at the same time, it is not necessary to change the original architecture design of the display panel 10, and it is convenient to adjust the charging time; the implementation is easy, and the cost is reduced.

Certainly, in addition to the above solution, any other solution that can make the bright line darker is available.

Figure 11:
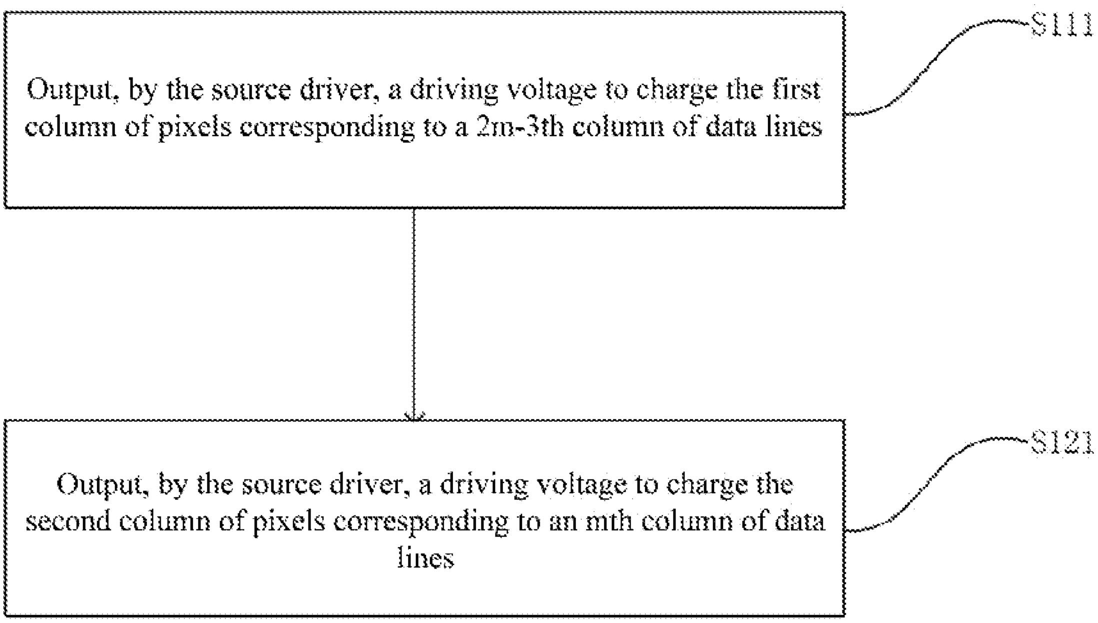
FIG. 11 is a schematic flow chart of a driving method for a display panel according to an embodiment of the present application.

In one or more embodiments, as shown in FIG. 11, the step of outputting, by the source driver 150, a driving voltage to charge a first column of pixels 132 when a 2n−1th row of scanning lines 120 receives a gate starting signal also includes:

S111: outputting, by the source driver 150, a driving voltage to charge the first column of pixels 132 corresponding to a 2m−3th column of data lines 110, where a driving voltage output to the first column of pixels 132 corresponding to the 2m−3th column of data lines 110 is smaller than a driving voltage output to the second column of pixels 133 corresponding to the 2m−3th column of data lines 110.

The step of outputting, by the source driver 150, a driving voltage to charge a second column of pixels 133 when a 2nth row of scanning lines 120 receives a gate starting signal also includes:

S121: outputting, by the source driver 150, a driving voltage to charge the second column of pixels 133 corresponding to an mth column of data lines 110, where a driving voltage output to the second column of pixels 133 corresponding to the mth column of data lines 110 is smaller than a driving voltage output to the second column of pixels 133 corresponding to the 2m−3th column of data lines 110.

On the basis of reducing the brightness of the first column of pixels 132 connected to the 2m−1th column of data lines 110, the display brightness of the first column of pixels 132 connected to the 2m−3th column of data lines 110 and the second column of pixels 133 connected to the mth column of data lines 110 is reduced, and the brightness difference from the display brightness of the second column of pixels 133 connected to the 2m−3th column of data lines 110 is reduced; the influence of vertical bright and dark lines on the entire display panel 10 under the kill pattern is reduced, and thus the display effect of the display panel 10 is improved more obviously.

In one or more embodiments, the source driver 150 outputs a driving voltage to each column of pixels 130, where for a same gray scale value, a driving voltage corresponding to all the first columns of pixels 132 is smaller than a driving voltage corresponding to the second column of pixels 133.

The driving voltage corresponding to all the first columns of pixels 132 is smaller than the driving voltage corresponding to the second column of pixels 133, so that the display brightness of all the first columns of pixels 132 of the display panel 10 is darkened, and the difference from the display brightness of the second column of pixels 133 is reduced; therefore, vertical bright and dark lines are not so obvious, the influence of the vertical bright and dark lines on the whole display panel 10 is reduced, and thus the display effect of the display panel 10 is improved more obviously.

In one or more embodiments, the source driver 150 outputs a positive 7 volt driving voltage to the first column of pixels 132 in the 2n−1th pixel group 131 connected to the 2m−3th column of data lines 110, and a negative 7 volt driving voltage to the second column of pixels 133.

A driving voltage output to the first column of pixels 132 in the 2nth pixel group 131 connected to the 2m−3th column of data lines 110 is positive 7 volts, and a driving voltage output to the second column of pixels 133 is negative 7 volts.

In one or more embodiments, the source driver 150 outputs a 0 volt driving voltage to the first column of pixels 132 in the 2n−1th pixel group 131 connected to the mth column of data lines 110, and a positive 7 volt driving voltage to the second column of pixels 133.

A driving voltage output to the first column of pixels 132 in the 2nth pixel group 131 connected to the mth column of data lines 110 is 0 volt, and a driving voltage output to the second column of pixels 133 is negative 7 volts.

In one or more embodiments, the source driver 150 outputs a positive 7 volt driving voltage to the first column of pixels 132 in the 2n−1th pixel group 131 connected to the 2m−1th column of data lines 110, and a 0 volt driving voltage to the second column of pixels 133.

A driving voltage output to the first column of pixels 132 in the 2nth pixel group 131 connected to the mth column of data lines 110 is negative 7 volts, and a driving voltage output to the second column of pixels 133 is 0 volt.

Certainly, a driving voltage of the first column of pixels 132 and a driving voltage of the second column of pixel 133 may also be other feasible voltages.

Figure 12:
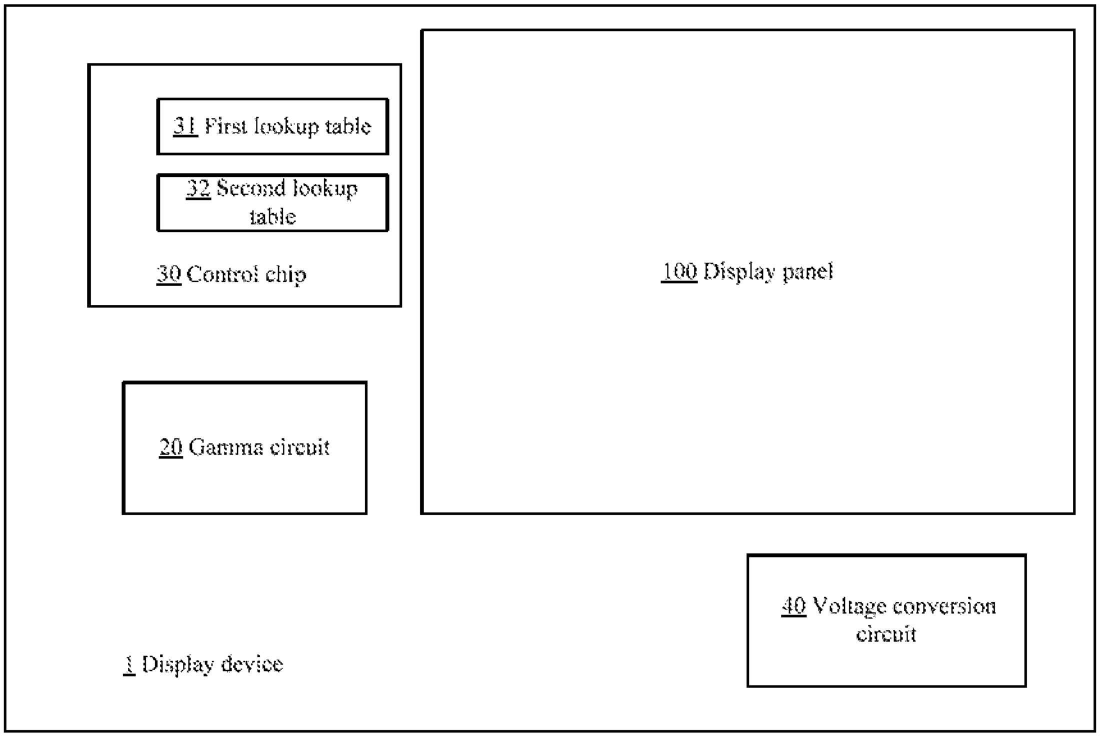
FIG. 12 is a schematic view of a display device according to an embodiment of the present application.

As shown in FIG. 12, an embodiment discloses a display device 1 which includes the above display panel 10, and the display device 1 also includes: a gamma circuit 20 that outputs a gamma voltage; a control chip 30 that outputs a data signal to a source driver 150, and outputs a control signal to a gate driver 140; and a voltage conversion circuit 40 that outputs a conversion voltage to the gamma circuit 20 and the control chip 30.

The data signal includes STH, Mini-LVDS, CPH, TP, etc., and the control signal includes STV CPV, OE, etc.; the control chip 30 includes a timing controller (TCON); and the conversion voltage includes a digital operating voltage DVDD, an analog voltage AVDD, a gate turn-on voltage Vgh, a gate turn-off voltage VgL, and the like.

The display device 1 in this solution includes the above-described display panel 10, which improves the phenomenon of vertical bright and dark lines, and has a good display effect.

In one or more embodiments, the control chip 30 includes a first lookup table 31 and a second lookup table 32, and voltages and time corresponding to gray scales are preset in the first lookup table 31 and the second lookup table 32; when it is detected on a picture that the second column of pixels 133 on the 2m−1th column of data lines 110 and the first column of pixels 132 on the mth column of data lines 110 are turned off, voltages and time required for the source driver 150 and the gate driver 140 are searched for from the second lookup table 32; and when it is detected on the picture that the second column of pixels 133 on the 2m−1th column of data lines 110 and the first column of pixels 132 on the mth column of data lines 110 are turned off, voltages and time required for the source driver 150 and the gate driver 140 are searched for from the second lookup table 32.

The control chip 30 is provided with the first lookup table 31 and the second lookup table 32 for outputting different voltages and time for different detection conditions to improve the phenomenon of vertical bright and dark lines.

It should be noted that it is not determined that the limitation of each step involved in this solution limits the sequence of steps on the premise of affecting the implementation of the specific solution. The previous steps may be performed first, or may also be executed later, or even executed at the same time, which should be considered as being within the scope of protection of the present application as long as this solution can be implemented.

The technical solutions of the present application can be widely applied to various display panels 10, such as a twisted nematic (TN) display panel 10, an in-plane switching (IPS) display panel 10, a vertical alignment (VA) display panel 10, or a Multi-Domain vertical alignment (MVA) display panel 10, and certainly, the display panels may also be other types of display panels 10, such as an organic light-emitting diode (OLD) display panel 10, which can all be suitable for the above solutions.

The above are detailed descriptions of the present application in conjunction with the specific embodiments, but the specific implementation of the present application cannot be determined as being limited to these descriptions. For a person of ordinary skill in the art to which the present application pertains, a number of simple deductions or substitutions may also be made without departing from the concept of the present application. All these should be considered as falling within the scope of protection of the present application.

What is claimed is:

1. A driving method for a display panel, the display comprising: a substrate, a multiplicity of data lines disposed on the substrate; a multiplicity of scanning lines disposed on the substrate; a multiplicity of pixels connected with the corresponding data lines and the corresponding scanning lines respectively; a gate driver that outputs gate starting signals to the scanning lines to turn on the pixels; and a source driver that outputs data driving signals to the data lines to charge the pixels;

wherein each row of pixels comprises a plurality of pixel groups, and each pixel group comprises a first column of pixels and a second column of pixels which are adjacent; the first column of pixels and the second column of pixels are connected to a same data line; the first column of pixels is connected with a (2n−1)-th row of scanning lines, and the second column of pixels is connected with a (2n)-th row of scanning lines; wherein during a display period, the source driver outputs data driving signals of opposite polarities, respectively, to the first column of pixels and the second column of pixels in the same pixel group connected to the same data line; wherein for the first column of pixels of the next pixel group connected to the same data line, the data driving signals output by the source driver have a polarity opposite to the polarity of the first column of pixels of the previous pixel group; wherein the source driver outputs a driving voltage to each column of pixels, wherein for a same gray scale value, a driving voltage corresponding to the first column of pixels of at least one column is smaller than a driving voltage corresponding to the second column of pixels; and the n is a natural number that is at least 1;

wherein the driving method comprises:

outputting, by the source driver, a driving voltage to charge the first column of pixels when the (2n−1)-th row of scanning lines receives a gate starting signal;

outputting, by the source driver, a driving voltage to charge the second column of pixels when the (2n)-th row of scanning lines receives a gate starting signal;

wherein for a same gray scale value, a driving voltage corresponding to the first column of pixels of at least one column is smaller than a driving voltage corresponding to the second column of pixels; and the n is a natural number that is at least 1;

wherein the first column of pixels connected to a (2m−3)-th column of data lines is blue, and the second column of pixels to a (2m−3)-th column of data lines is green; the first column of pixels connected to an m-th column of data lines is red, and the second column of pixels connected thereto is blue; the first column of pixels connected to a (2m−1)-th column of data lines is green, and the second column of pixels connected thereto is red; the driving method comprises steps of:

detecting a picture displayed on the display panel before the (2n−1)-th row of scanning lines receives the gate starting signal;

when it is detected that the second column of pixels on the (2m−1)-th column of data lines and the first column of pixels on the m-th column of data lines are turned off, outputting, by the source driver, a driving voltage to charge the first column of pixels corresponding to the (2m−1)-th column of data lines and the second column of pixels corresponding to the (2m−3)-th column of data lines;

wherein a driving voltage output to the first column of pixels corresponding to the (2m−1)-th column of data lines is smaller than a driving voltage output to the second column of pixels corresponding to the (2m−3)-th column of data lines; and the m is an even number that is at least 2;

wherein the source driver outputs a positive 7 volt driving voltage to the first column of pixels in the (2n−1)-th pixel group connected to the (2m−3)-th column of data lines, and a negative 7 volt driving voltage to the second column of pixels.

2. The driving method for the display panel according to claim 1, wherein the step of outputting, by the source driver, a driving voltage to charge a first column of pixels when a 2n−1th row of scanning lines receives a gate starting signal also comprises:

outputting, by the source driver, a driving voltage to charge the first column of pixels corresponding to a 2m−3th column of data lines, wherein a driving voltage output to the first column of pixels corresponding to the 2m−3th column of data lines is smaller than a driving voltage output to the second column of pixels corresponding to the 2m−3th column of data lines;

the step of outputting, by the source driver, a driving voltage to charge a second column of pixels when a 2nth row of scanning lines receives a gate starting signal also comprises:

outputting, by the source driver, a driving voltage to charge the second column of pixels corresponding to an mth column of data lines, wherein a driving voltage output to the second column of pixels corresponding to the mth column of data lines is smaller than a driving voltage output to the second column of pixels corresponding to the 2m−3th column of data lines.

3. The driving method for the display panel according to claim 1, wherein the source driver outputs a driving voltage to each column of pixels, wherein for a same gray scale value, a driving voltage corresponding to all the first columns of pixels is smaller than a driving voltage corresponding to the second column of pixels.

4. The driving method for the display panel according to claim 1, wherein the source driver outputs a positive 7 volt driving voltage to the first column of pixels in the (2n)-th pixel group connected to the (2m−3)-th column of data lines.

5. The driving method for the display panel according to claim 4, wherein the source driver outputs a negative 7 volt driving voltage to the second column of pixels in the (2n)-th pixel group connected to the (2m−3)-th column of data lines.

6. The driving method for the display panel according to claim 1, wherein the source driver outputs a 0 volt driving voltage to the first column of pixels in the (2n−1)-th pixel group connected to the m-th column of data lines.

7. The driving method for the display panel according to claim 6, wherein the source driver outputs a positive 7 volt driving voltage to the second column of pixels in the (2n−1)-th pixel group connected to the m-th column of data lines.

8. The driving method for the display panel according to claim 7, wherein the source driver outputs a 0 volt driving voltage to the first column of pixels in the (2n)-th pixel group connected to the m-th column of data lines.

9. The driving method for the display panel according to claim 8, wherein the source driver outputs a 7 volt driving voltage to the second column of pixels in the (2n)-th pixel group connected to the m-th column of data lines.

10. A display device, comprising a display panel, the display comprising: a substrate, a multiplicity of data lines disposed on the substrate; a multiplicity of scanning lines disposed on the substrate; a multiplicity of pixels connected with the corresponding data lines and the corresponding scanning lines respectively; a gate driver that outputs gate starting signals to the scanning lines to turn on the pixels; and a source driver that outputs data driving signals to the data lines to charge the pixels;

wherein each row of pixels comprises a plurality of pixel groups, and each pixel group comprises a first column of pixels and a second column of pixels which are adjacent; the first column of pixels and the second column of pixels are connected to a same data line; the first column of pixels is connected with a (2n−1)-th row of scanning lines, and the second column of pixels is connected with a (2n)-th row of scanning lines; wherein during a display period, the source driver outputs data driving signals of opposite polarities, respectively, to the first column of pixels and the second column of pixels in the same pixel group connected to the same data line; wherein for the first column of pixels of the next pixel group connected to the same data line, the data driving signals output by the source driver have a polarity opposite to the polarity of the first column of pixels of the previous pixel group; wherein the source driver outputs a driving voltage to each column of pixels, wherein for a same gray scale value, a driving voltage corresponding to the first column of pixels of at least one column is smaller than a driving voltage corresponding to the second column of pixels; and the n is a natural number that is at least 1;

wherein the display device further comprises:

a gamma circuit that outputs a gamma voltage;

a control chip that outputs a data signal to the source driver, and outputs a control signal to the gate driver; and a voltage conversion circuit that outputs a conversion voltage to the gamma circuit and the control chip;

wherein the control chip comprises a first lookup table and a second lookup table, and voltages and time corresponding to gray scales are preset in the first lookup table and the second lookup table;

when it is detected on a picture that the second column of pixels on the (2m−1)-th column of data lines and the first column of pixels on the m-th column of data lines are turned off, voltages and time required for the source driver and the gate driver are searched for from the second lookup table; and when it is detected on the picture that the second column of pixels on the (2m−1)-th column of data lines and the first column of pixels on the m-th column of data lines are not turned off, voltages and time required for the source driver and the gate driver are searched for from the second lookup table.

11. The display device according to claim 10, wherein the conversion voltage comprises a digital operating voltage, an analog voltage, a gate turn-on voltage, and a gate turn-off voltage.

12. The display device according to claim 10, wherein the control chip comprises a timing controller.

* * * * *